No. 874,335. PATENTED DEC. 17, 1907.
W. H. HARDEN.
TRAP.
APPLICATION FILED JUNE 17, 1907.

5 SHEETS—SHEET 1.

WITNESSES

INVENTOR
William H. Harden
BY
ATTORNEYS

No. 874,335.
PATENTED DEC. 17, 1907.
W. H. HARDEN.
TRAP.
APPLICATION FILED JUNE 17, 1907.
5 SHEETS—SHEET 2.
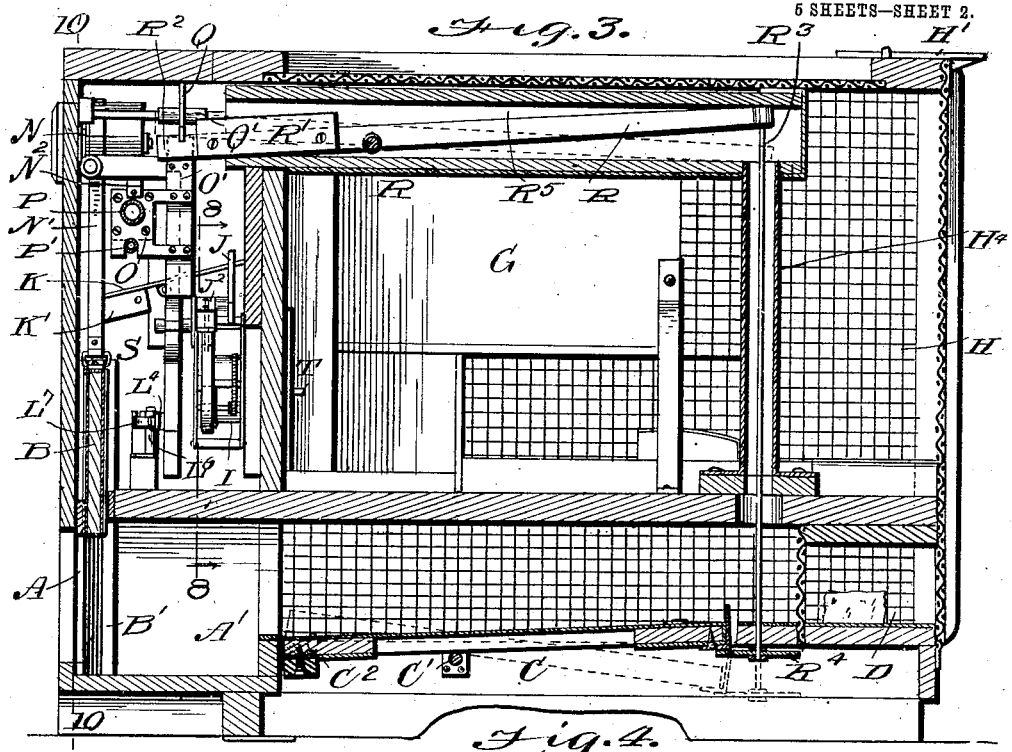
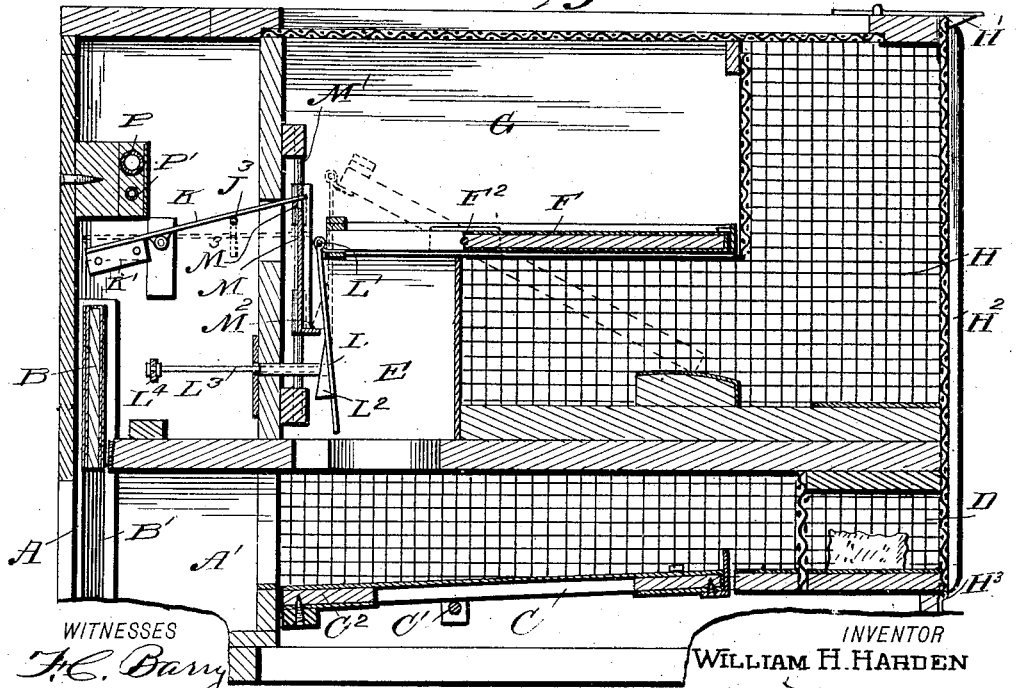
WITNESSES
F. C. Barry
Percy B. Turpin
INVENTOR
WILLIAM H. HARDEN
BY Munn & Co.
ATTORNEYS No. 874,335. PATENTED DEC. 17, 1907.
W. H. HARDEN.
TRAP.
APPLICATION FILED JUNE 17, 1907.
5 SHEETS—SHEET 3.
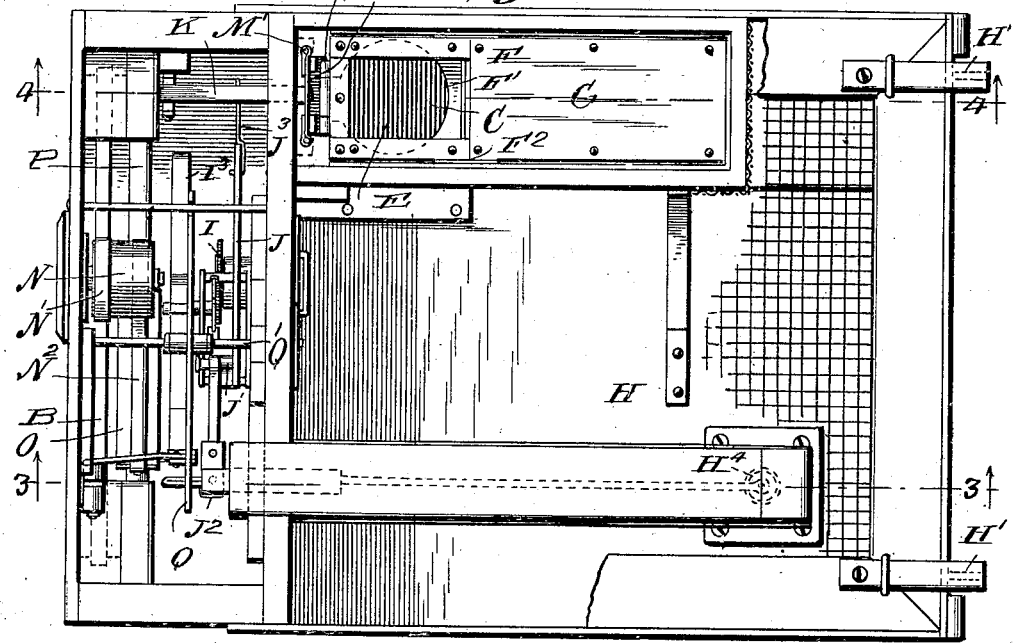
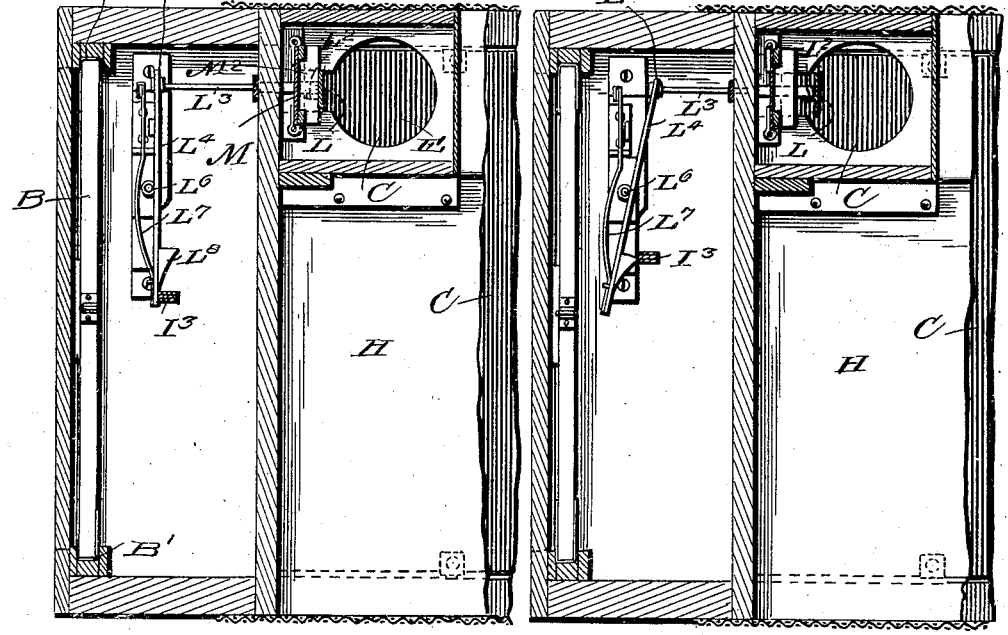
WITNESSES
F. C. Barry
Percy B. Turpin
INVENTOR
WILLIAM H. HARDEN
BY Munn & Co.
ATTORNEYS.

No. 874,335. PATENTED DEC. 17, 1907.
W. H. HARDEN.
TRAP.
APPLICATION FILED JUNE 17, 1907.
5 SHEETS—SHEET 4.
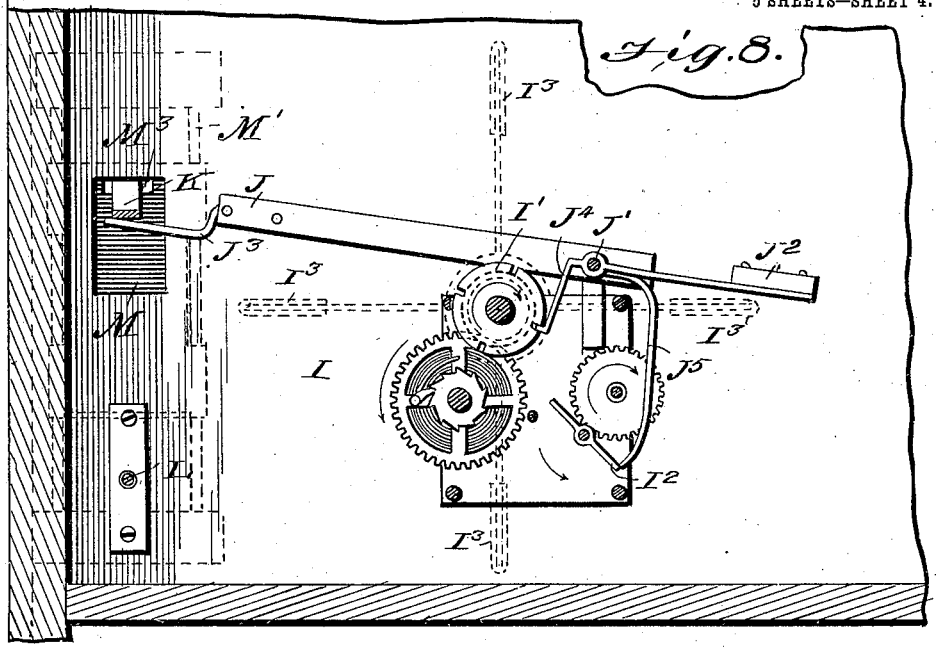
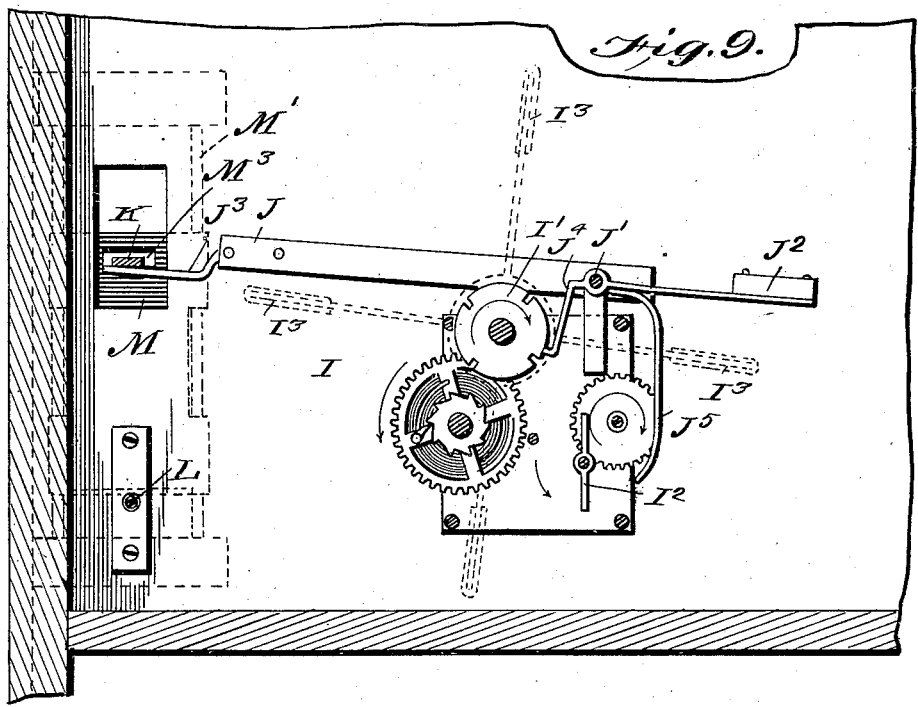
WITNESSES
F. C. Barry
Perry B. Turpin
INVENTOR
WILLIAM H. HARDEN
BY Munn & Co
ATTORNEYS No. 874,335. PATENTED DEC. 17, 1907.
W. H. HARDEN.
TRAP.
APPLICATION FILED JUNE 17, 1907.

5 SHEETS—SHEET 5.

WITNESSES
F. C. Barry
Perry B. Turpin

INVENTOR
William H. Harden
BY
Munn & Co.
ATTORNEYS

UNITED STATES PATENT OFFICE.

WILLIAM HAMILTON HARDEN, OF QUITMAN, GEORGIA, ASSIGNOR OF ONE-HALF TO JOHN E. GIBSON, OF QUITMAN, GEORGIA.

TRAP.

No. 874,335.  Specification of Letters Patent.  Patented Dec. 17, 1907.

Application filed June 17, 1907. Serial No. 379,409.

*To all whom it may concern:*

Be it known that I, WILLIAM HAMILTON HARDEN, a citizen of the United States, and a resident of Quitman, in the county of Brooks and State of Georgia, have invented certain new and useful Improvements in Traps, of which the following is a specification.

My invention is an improvement in traps, and especially in that class of traps known as "self-set" and "ever-set"; and the invention consists in certain novel constructions and combinations of parts, as will be hereinafter described and claimed.

Figure 1:
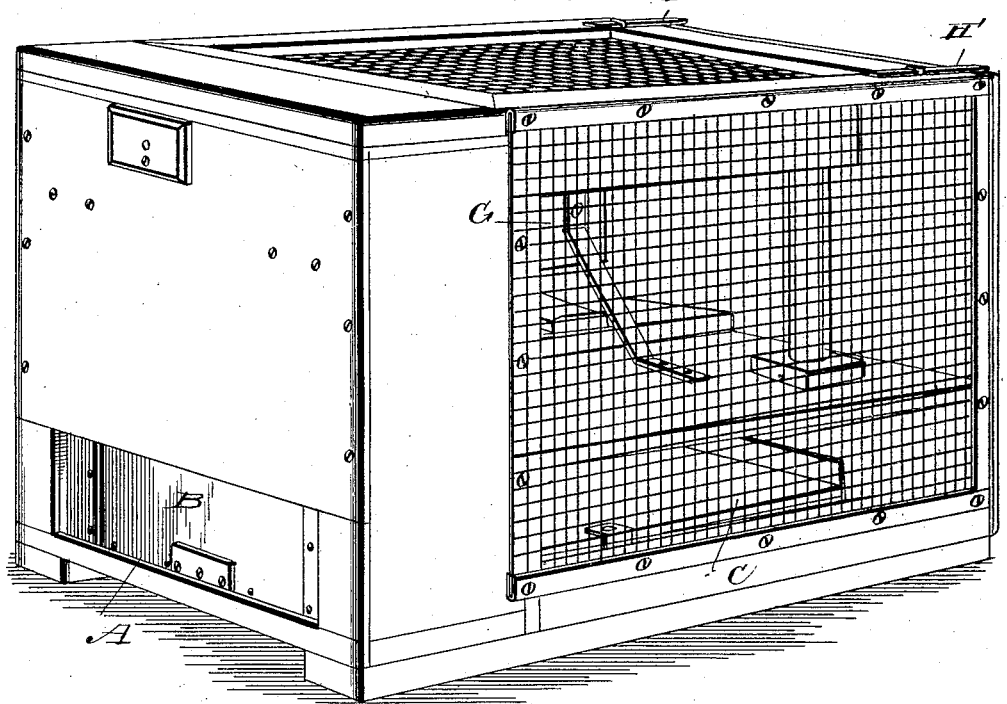
Figure 2:
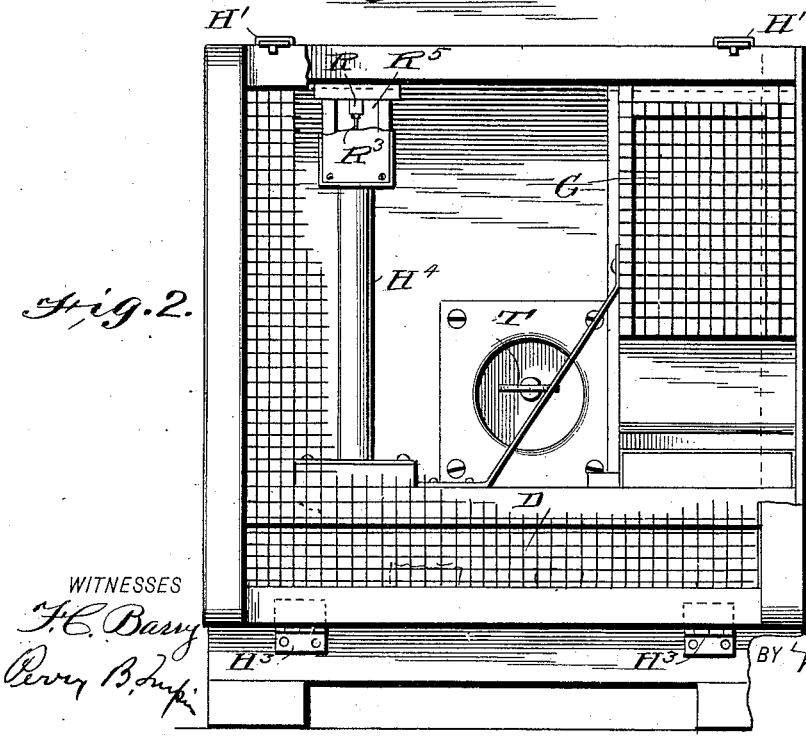
Figure 10:
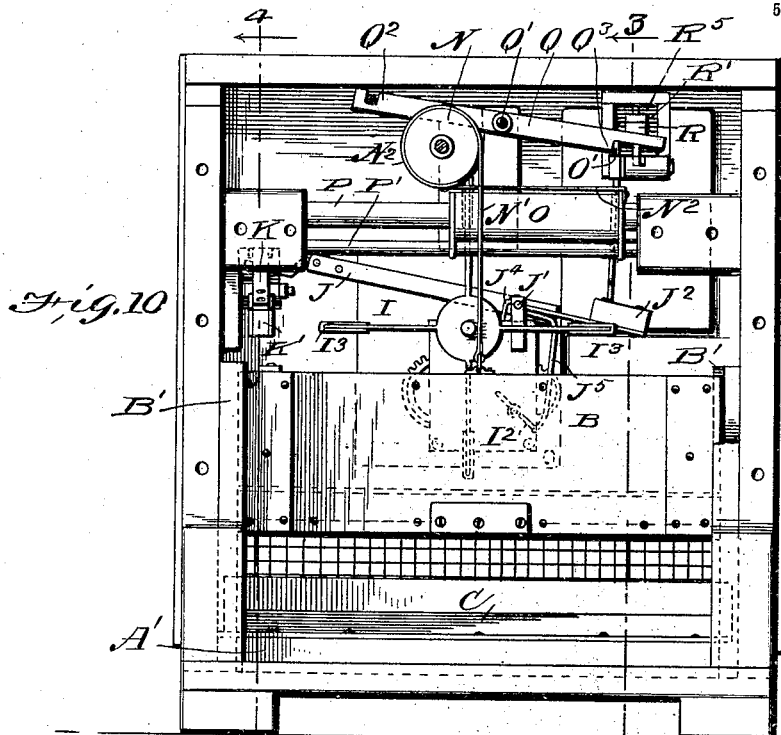
Figure 11:
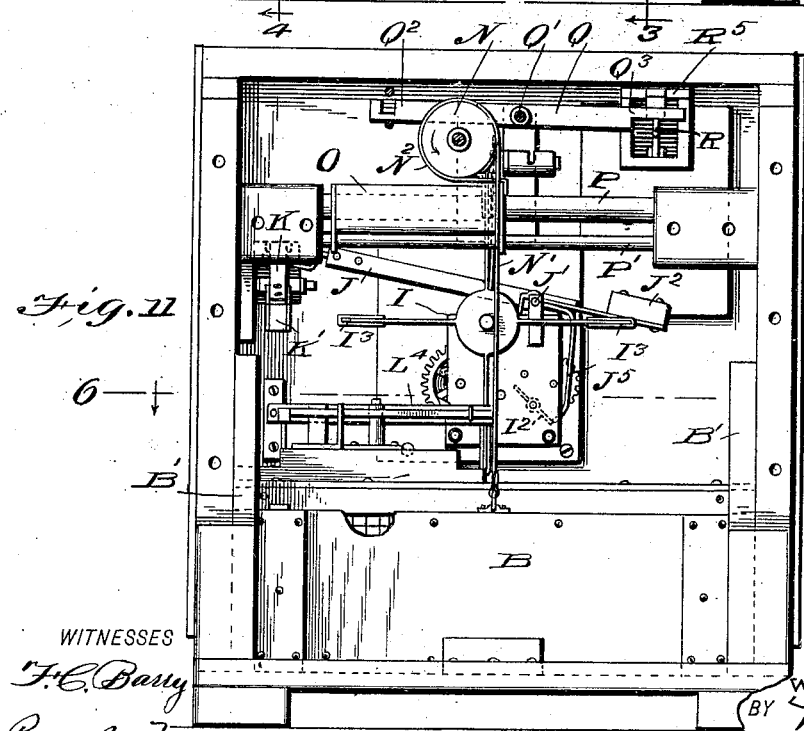
Figure 12:
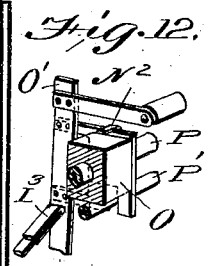

In the drawings, Figure 1 is a perspective view of a trap embodying my invention, looking at the front end of the trap. Fig. 2 is a rear elevation of the trap partly broken away. Fig. 3 is a vertical longitudinal section on about line 3—3 of Figs. 5 and 10. Fig. 4 is a vertical longitudinal section on about line 4—4 of Figs. 5 and 10. Fig. 5 is a top plan view of the trap, the top plate or cover being removed. Fig. 6 is a horizontal section on about line 6—6 of Fig. 11. Fig. 7 is a section on the same line illustrating the parts in a different position. Fig. 8 is a detail vertical section on about line 8—8 of Fig. 3. Fig. 9 is a section on the same line showing the parts in a different position. Fig. 10 is a front elevation of the apparatus the front board or plate being removed and the door being shown as raised to permit the entrance of a rat. Fig. 11 is a view similar to Fig. 10 showing the door lowered, and Fig. 12 is a detail view illustrating the carriage and the power driven wheel for readjusting the same in order to open the door, all of which will be more fully described.

The sides, top and ends of the trap, which latter may be of any suitable design, may be suitably closed by means of wire netting or otherwise, as found desirable, and I make the trap with an entrance opening A, leading to what for convenience of reference I term the entrance chamber A' into which the rat enters, after it passes below the door B. The chamber A' is provided with a tilting platform C, pivoted at C', weighted at its front end $C^2$ to normally assume the position shown in Figs. 3 and 4 and arranged at its rear end to be depressed by the weight of a rat to the dotted line position shown in Fig. 3. This platform C extends from side to side of the trap and forms the bottom of the major portion of the entrance chamber, the bait holder D being in rear of the entrance chamber so the animal will enter, and pass onto the rear end of the platform C in seeking the bait. When the animal passes onto the rear end of the platform, and the latter is depressed to the dotted line position shown in Fig. 3, this operation through the intermediate devices presently described will release the door B and the latter will fall, retaining the animal in the entrance chamber A. In seeking to escape the animal will pass from the entrance chamber A, upwardly through the intermediate passage E and thence through an opening F' in the trap door F into the trap chamber G. The trap door F is pivoted at $F^2$ so its rear end may be lowered by the weight of the animal passing thereon to the position indicated in dotted lines Fig. 4, delivering the animal to the cage chamber H. This cage chamber forms a storage space in which the animal is retained until it is desired to remove it, which may be easily accomplished by unlatching at H' the rear wall $H^2$ of the cage chamber, said wall being hinged at its lower end at $H^3$, so it can be opened to remove the rats when desired. As the animal passes onto the rear end of the trap door F, the latter is tilted and the upward movement of its front end operates through the devices presently described to readjust the door from the closed position shown in Figs. 1 and 11 to the open position shown in Figs. 3, 4 and 10 so the animal will automatically drop the door to close the same and then by his course through the trap will operate the devices which will effect the opening of the door.

In operating certain of the parts, I provide a clock train I, see Figs. 8 and 9 and this clock train has a notched wheel I' and a fly fan $I^2$, in train and on one of the shafts of the train, preferably the shaft of the notched wheel I', I provide an armed wheel whose arms $I^3$, indicated in dotted lines Figs. 8 and 9, and shown in Figs. 10 and 11, operate to readjust the carriage presently described and also to release certain devices operated from the trap door F.

A lever J extends over the clock train, is pivoted at J' between its ends and is weighted at one end $J^2$ to normally assume the position shown in Fig. 8, and at its other end the lever J is arranged at $J^3$ to be depressed by the action of a lever K which extends transversely across the end J³ of the lever, see Figs. 4, 5, 8, and 9, and is weighted at its front end K' to normally assume the position shown in Fig. 3, in which it will not operate upon the lever J. The lever J is provided with a dog J⁴ which enters the notches of the wheel I' when in the position shown in Fig. 8, and rides upon the edge of the wheel I' in the position shown in Fig. 9, and the said lever J also has an arm J⁵ which projects into and out of the path of the fly fan I² and when in the path of said fly fan restrains the operation of the clock train and when out of the path of said fly fan permits the clock train to operate as will be understood from Figs. 8 and 9 of the drawings. The lever J therefore operates as a means for restraining the operation of the clock train and this lever J is freed from engagement with the clock train by the action of the lever K, which lever K is operated by the aid of the trap door F, as will now be described.

At its front end the trap door is provided with a hanger plate L, pivoted at its upper end L' to the front end of the trap door and provided on its front face near its lower swinging end with a ratchet tooth L² having a square lower edge which projects forwardly from the front face of the hanger plate L and an inclined upper face which slopes from the front edge of the lower square face of the tooth L² toward the front face of the hanger plate L, as shown in Fig. 4. A slide M in the form of a plate is mounted to slide up and down on rods M' and this slide M is provided at its lower end with a rearwardly projecting wing M² upon which the square lower end of the tooth L² engages when the trap door is tilted to the dotted line position indicated in Fig. 4, so that when the trap door swings by gravity after the animal passes into the cage chamber, to the position shown in Fig. 4, it will lower the plate M and this plate as it is lowered operates to rock the lever K which connects at its rear end with the slide M by projecting through an opening M³ in said slide to cause the rear end of the lever K to depress the end J³ of the lever J and thus free said restraining lever J from engagement with the clock train so the latter may move one step from notch to notch of the wheel I' to cause a quarter revolution of the said wheel I' and of the armed wheel I³ on the shaft of said notched wheel I', this operation effecting a readjustment of the devices in order to open the door, as presently described.

When the slide M is lowered to rock the lever K, it is desired to quickly release the slide after its downward movement so the restraining lever J will be free after it has escaped from the notch of the wheel I', so it may ride on the edge of the said wheel I' to enter the next succeeding notch. This is effected by a push rod L³ arranged as best shown in Fig. 4, and arranged to be pushed back at its rear end against the front side of the plate L and alongside the tooth L² in order to shift the hanger plate L from the dotted line position to the full line position, as shown in Fig. 4. This push rod L³ is operated by a lever L⁴ to which it is connected at one end L⁵, the lever L⁴ being pivoted at L⁶, actuated by a spring L⁷ normally to the position shown in Fig. 6 in which it turns the push rod L³ forwardly and provided at one end with a cam L⁸ on which the arms I³ of the clock train operate, as will be understood from Figs. 6, 7 and 11.

In operation when the push rod L³ is forced forwardly by the operation of the lever L⁴ by the arm I³, as will be understood from Fig. 6, the ratchet tooth of the hanger rod will be freed from engagement with the wing M² of the slide M, see Fig. 4 and the latter will be readjusted to the position shown in Fig. 4 by the lever K, which is weighted at K', as before described.

In the operation of the trap door, and the parts connected therewith, it will be noticed that when the trap door is tilted, to the dotted line position shown in Fig. 4, it will lift at its front end the hanger plate L so the tooth L² thereof will be adjusted into engagement with the slide plate M. Then when the trap door is readjusted to the full line position shown in Fig. 4, it will force down with its hanger plate L the slide M. This operation through the lever K will free the restraining lever J from engagement with the clock train and the latter may be turned a quarter revolution. In so doing its arms I³ will operate the push rod L³ by the aid of the lever L⁴ to free the hanger plate L from engagement with the slide M so the latter may be readjusted by the action of the lever K to position for a new operation, and the lever K will adjust to position to free the restraining lever J so the latter may operate to check the movement of the clock train at the succeeding notch in the wheel I'. Such operation of the clock train by the aid of its arms I³ operates to re-open the door B of the trap, thus setting it for another rat. To this end I suspend the door B which operates in suitable guides B' from a drum N by means of a strap or connection N' so the door will drop by gravity when the drum is freed and may be raised by the proper turning of said drum, as will now be described. For turning the drum to raise the door I provide a laterally sliding carriage, partially shown in detail in Fig. 12, and comprising a body O to which is attached a strap N² which connects the carriage with the drum so the carriage when moved from the position shown in Fig. 11 to that shown in Fig. 10 will turn the drum in the direction indicated by the arrow in Fig. 11, and will thus raise the door B, as will be understood from Figs. 10 and 11. This body O of the carriage slides on guides P and P' which are preferably of glass, so they will not corrode in the use of the invention. The carriage when moved to the position shown in Fig. 10 is held by a latch Q, pivoted at Q', limited in its rocking movements at Q², and arranged at Q³ to engage with a plate O' on the carriage when the latch is in the position shown in Fig. 10. If this latch should be raised at its end Q³ from the position shown in Fig. 10 to that shown in Fig. 11, it would release the carriage and the door would drop by gravity from the open position shown in Fig. 10 to the closed position shown in Fig. 11, the carriage sliding freely back on its guides P and P' to the position shown in Fig. 11. To release the latch Q, I provide the lever R extending from the front to the rear of the trap, weighted at its front end at R' and underlying at said end the latch Q, being for such purpose provided at its front end with a lug or extension R² so that when the lever R which normally is in the position shown in Fig. 3 is tilted to the dotted line position shown in said figure it will free the latch to release the door so the latter may fall. At its rear end the lever R is provided with a depending rod R³, suitably guided at its lower end and provided at said end with a plate R⁴ in the form of a disk underlying the rear edge of the tilting platform C, so that when the rat passes onto the rear end of the platform C and it has assumed the dotted line position shown in Fig. 3, he will operate the rod R³ and the lever R to release the latch and permit the door to close, thus trapping the animal. The readjustment of the door to open position is effected by the arms I³ of the clock train, the said arms when turning a quarter revolution pressing against the bearing surface on the carriage as shown in Fig. 12 so that the arms I³ of the train will move the carriage from the position shown in Fig. 11 to that shown in Fig. 10. The connecting rod R³ is carried through an upright tube H⁴ extending upwardly through the cage chamber H and communicating at its upper end with the rear end of a box R⁵ in which the lever R operates so the said parts will not be interfered with by the rats when in the trap.

From the foregoing in connection with the accompanying drawings, it will be noticed that I provide a trap having an entrance chamber, a trap chamber, a passage connecting the entrance and the trap chambers, and cage chamber together with a door for the entrance chamber, a tilting platform in said chamber, means whereby the platform may operate to permit the door to close, a tilting trap door between the trap chamber and the cage chamber, and means actuated by the trap door whereby to re-open the door, said means comprising a clock train or power mechanism which I prefer to inclose within what for convenience of reference I term the power chamber S at the front of the machine and over the front end of the entrance chamber.

In operation, supposing the parts to be in the position shown in Figs. 3, 4, 5, 6 and 10, if a rat enters the entrance chamber and passes onto the rear end of the tilting platform C, his weight will tilt the platform to the dotted line position shown in Fig. 3. This will depress the rod R³, rock the lever R from the full line position, Fig. 3, to the dotted line position in said figure, the front end of the lever R will raise the latch Q out of engagement with the carriage and the weight of the door will cause the same to drop to the closed position, as shown in Fig. 11. The rat is now trapped. Seeking an escape he will pass through the passage E onto the trap door, F. He then passes onto the rear end of the trap door F, tilting the same to the dotted line position shown in Fig. 4, and is then deposited in the cage chamber. This tilting of the trap door will raise the hanger plate L to the dotted line position shown in Fig. 4, so that when the trap door drops by gravity to the full line position, Fig. 4, it will force the slide M down. In this operation the said slide will rock the lever K from the full line position shown in Fig. 4 to the dotted line position shown in the same figure and this lever K will in such operation depress the end J³ of the restraining lever J and free said restraining lever from engagement with the clock train so the latter may be turned one step. In thus turning one step, one of the arms I³ of the clock train will move the carriage O from the position shown in Fig. 11 to that shown in Fig. 10 re-opening the door for the entrance of another rat, and another arm I³ of the clock train will operate upon the lever L⁴ to tilt the same to the dotted line position shown in Fig. 6 and illustrated in full lines Fig. 7 in which it will operate the push rod L³ to shift the hanger plate L out of engagement with the slide M so the latter may be readjusted to the position shown in Fig. 4 by the action of the lever K, the latter freeing the restraining lever J so the said lever J may be in position to engage by its dog J⁴ with the notched wheel I' and by its arm J⁵ with the fly fan I², thus stopping the operation of the motor at the proper time. This operation may be repeated a number of times according to the capacity of the clock train. An ordinary clock train will provide for about fifty operations, after which the clock may be re-wound at T, see Fig. 2, for another series of operations.

I claim—

1. A trap having an entrance chamber, a trap chamber, a passageway connecting the entrance chamber and the trap chamber, and a cage chamber combined with a door for the entrance chamber, a tilting platform in said chamber, means whereby the platform may operate to permit the door to close, a trap door between the trap chamber and the cage chamber, a clock train for opening the entrance door, a slide, means carried by the trap door for operating the slide in one direction, a restraining device for the clock train, means operated by the slide for releasing the restraining device, and means operated by the clock train for freeing the slide from engagement with the means carried by the trap door for operating the said slide, substantially as set forth.

2. The combination in a trap of an entrance chamber, a door therefor, a tilting platform, means operated from the platform for releasing the door to permit the latter to close, means for opening the door, a trap door arranged for operation by the trapped animal, a hanger plate pivoted at its upper end to the trap door and having a ratchet tooth, a slide plate having a portion for engagement by said tooth, means for releasing the ratchet tooth from engagement with the slide, a clock train for opening the entrance door, a restraining device for said train and means operated from the slide plate whereby to release the restraining device, substantially as set forth.

3. The combination in a trap of a tilting trap door, a hanger plate suspended therefrom and provided with a ratchet tooth, a slide having a portion for engagement by such ratchet tooth whereby the slide may be operated by the movement of the trap door, a clock train, means for restraining the same, means whereby the restraining means are released by the operation of the slide, and means operated by the clock train for releasing the hanger plate from engagement with the slide.

4. The combination in a trap of an entrance door, a clock train, means operated thereby for opening the door, a tilting platform, a tilting trap door, a slide, means in connection with the trap door for operating the slide in one direction, a restraining device for the clock train, means operated by the slide for releasing said restraining device, and means operated by the clock train for freeing the slide from engagement with the means on the trap door for operating said slide, substantially as set forth.

5. The combination in a trap with a tilting trap door and a hanger plate pivoted at its upper end to and depending from said trap door and provided with a ratchet tooth, of a slide having a portion for engagement by the ratchet tooth, a push rod for freeing the tooth from engagement with the slide, an entrance door, a clock train, means whereby the clock train may operate to open the entrance door, a restraining device for the clock train, a lever operated by the slide whereby to free the restraining device from the clock train, and a lever operated by the clock train and arranged to move the push rod for freeing the hanger plate, substantially as set forth.

6. The combination in a trap of an entrance door, a drum, means suspending the door from the drum, a laterally sliding carriage, supporting means of glass on which said carriage slides, means connecting the carriage with the drum whereby it may operate the drum to open the door, and means for operating the carriage.

7. In a trap, the combination of an entrance door, a drum, means suspending the door from the drum, a laterally sliding carriage, means connecting the carriage with the drum, a clock train having revolving arms arranged to engage the carriage to shift the same to position to open the door, a detent for holding the carriage in such position, and means for operation by the trapped animal whereby to release the detent, substantially as set forth.

8. In a trap the combination of a vertically sliding entrance door, a drum for raising the same, a clock train and means operated thereby for turning the drum to open the door, means whereby the clock train may be set into operation by a trapped animal, and means operated by the trapped animal for releasing the door to permit the same to close.

9. The combination in a trap of a vertically sliding entrance door, a drum connected with the door for opening the same, a tilting platform in the path of the animal through the trap, a tilting trap door in the animal's path and in rear of the tilting platform, means operated by the tilting platform for permitting the entrance door to close, and means operated from the tilting trap door for re-opening the door, substantially as set forth.

10. A trap having an entrance chamber, a tilting platform a trap chamber, a cage chamber and a power chamber combined with a clock train in the power chamber, an entrance door, a drum connected with the entrance door for opening the same, a laterally sliding carriage connected with the drum for turning the same to open the door, a detent for said carriage, a lever for releasing the detent, a box in which said lever is incased, a tube extending from said box through the cage chamber and a rod extending through said tube and connected at its upper end with the lever and arranged at its lower end for operation by the tilting platform, a restraining device for the clock train, a trap door, means operated from the trap door for releasing the restraining device of the clock train, and means in the clock train for operating the carriage to turn the drum to re-open the door, substantially as set forth.

11. In a trap the combination of an entrance door, a drum, means for suspending the door from the drum, a movable carriage, means connecting the carriage with the drum whereby it may operate the drum to operate the door and a clock train having means operating upon the carriage whereby to actuate the same to open the door, substantially as set forth.

12. A trap having a vertically sliding entrance door, a laterally sliding carriage, intermediate devices between the carriage and the entrance door whereby the movement of the carriage may open the door, a clock train having means engaging with the carriage to actuate the same to open the door, a detent engaging with the carriage for holding the same in position with the door open, and means operated by the trapped animal for releasing the detent, substantially as set forth.

13. The combination in a trap of a vertically sliding entrance door, laterally extending glass guides arranged one above the other above said door, a carriage movable laterally on said guides, a drum, means suspending the entrance door from the drum, means connecting the drum with the carriage, a clock train for moving the carriage to position to open the door, a detent for retaining the carriage in such position, and means for releasing the detent, substantially as set forth.

14. The combination in a trap of the entrance door, a clock train, means for opening the door through the aid of the clock train, a restraining device for the clock train, a lever for releasing the restraining device, a slide plate for rocking said releasing lever, a trap door having means for depressing the slide plate, a push rod for moving said means out of engagement with the slide plate, a lever connected with said push rod and having a cam for operation by the clock train whereby to rock the lever in one direction, and a spring for readjusting the lever, substantially as set forth.

15. In a trap the combination of a tilting trap door having an opening through it for the passage of an animal, a hanger plate pivoted at its upper end to the trap door and having a ratchet tooth, a slide plate having a forwardly projecting wing for engagement by said ratchet tooth, means for releasing the ratchet tooth from engagement with the said wing, an entrance door, a clock train, intermediate devices between the clock train and the entrance door, whereby the clock train may open the entrance door, a restraining device for the clock train, and means operated from the sliding plate whereby to release the restraining device of the clock train, substantially as set forth.

WILLIAM HAMILTON HARDEN.

Witnesses:
CHAS. H. REMINGTON,
C. C. McRAE.